(12) United States Patent
Straughn

(10) Patent No.: US 7,413,227 B2
(45) Date of Patent: Aug. 19, 2008

(54) PRELOADED SPRING BUMPER FOR A VEHICLE

(75) Inventor: Joseph W. Straughn, Edwardsburg, MI (US)

(73) Assignee: Tru-Form Metal Products, Inc., Elkhart, IN (US)

( * ) Notice: Subject to any disclaimer, the term of this patent is extended or adjusted under 35 U.S.C. 154(b) by 257 days.

(21) Appl. No.: 11/214,365

(22) Filed: Aug. 29, 2005

(65) Prior Publication Data

US 2006/0066116 A1 Mar. 30, 2006

Related U.S. Application Data

(60) Provisional application No. 60/613,374, filed on Sep. 27, 2004.

(51) Int. Cl.
*B60R 19/28* (2006.01)

(52) U.S. Cl. .................................... 293/135

(58) Field of Classification Search ................ 293/102, 293/132, 135, 137; 296/187.01, 187.03, 296/187.09
See application file for complete search history.

(56) References Cited

U.S. PATENT DOCUMENTS

| | | | | |
|---|---|---|---|---|
| 759,507 A * | 5/1904 | Ericson et al. ............... 267/42 |
| 1,407,783 A | 2/1922 | Cissell |
| 1,455,573 A | 5/1923 | Cox |
| 1,468,868 A * | 9/1923 | Reichstetter, Jr. et al. ... 293/130 |
| 1,474,907 A | 11/1923 | McCormick |
| 1,504,548 A | 8/1924 | Gentle |
| 1,542,240 A | 6/1925 | Harris |
| 1,547,013 A | 7/1925 | Asner |
| 1,633,782 A | 6/1927 | Geanopulos |
| 1,665,320 A | 4/1928 | Nutt |
| 1,697,204 A * | 1/1929 | Nomicos ..................... 293/137 |
| 1,859,105 A | 5/1932 | Munro |
| 2,029,824 A | 2/1936 | La Pointe |
| 2,032,511 A * | 3/1936 | Stevenson .................... 224/489 |
| 2,573,510 A * | 10/1951 | Terranova .................... 293/137 |
| 3,663,048 A * | 5/1972 | Zimmerle .................... 283/135 |
| 3,804,447 A * | 4/1974 | Slavin ........................ 293/135 |
| 3,840,259 A * | 10/1974 | Barenyi ....................... 293/133 |
| 3,927,907 A * | 12/1975 | Bialek ........................ 293/135 |
| 4,014,582 A * | 3/1977 | MacKenzie ................. 293/107 |
| 4,397,490 A * | 8/1983 | Evans et al. ................. 293/120 |
| 4,401,332 A * | 8/1983 | Kimura et al. .............. 293/135 |
| 4,807,915 A * | 2/1989 | Shyi ............................ 293/132 |
| 4,852,704 A | 8/1989 | Brockenbrough et al. |
| 4,925,224 A | 5/1990 | Smiszek |
| 5,732,801 A | 3/1998 | Gertz |
| D402,603 S | 12/1998 | Witkowski |
| 5,971,451 A * | 10/1999 | Huang ........................ 293/102 |
| 6,007,123 A | 12/1999 | Schwartz et al. |
| 6,290,272 B1 | 9/2001 | Braun |

* cited by examiner

*Primary Examiner*—H Gutman
(74) *Attorney, Agent, or Firm*—Barnes & Thornburg LLP

(57) ABSTRACT

A bumper apparatus for a vehicle is provided. The bumper apparatus includes a bumper and a spring comprising a flexible ribbon of material. The spring has a first connector portion coupled to the bumper and a second connector portion adapted to couple to the vehicle. The spring also has a curvy portion coupled to the first and second connector portions. The bumper apparatus further includes a stop engaging the spring to hold the spring in a partially flexed state to preload the spring.

45 Claims, 3 Drawing Sheets

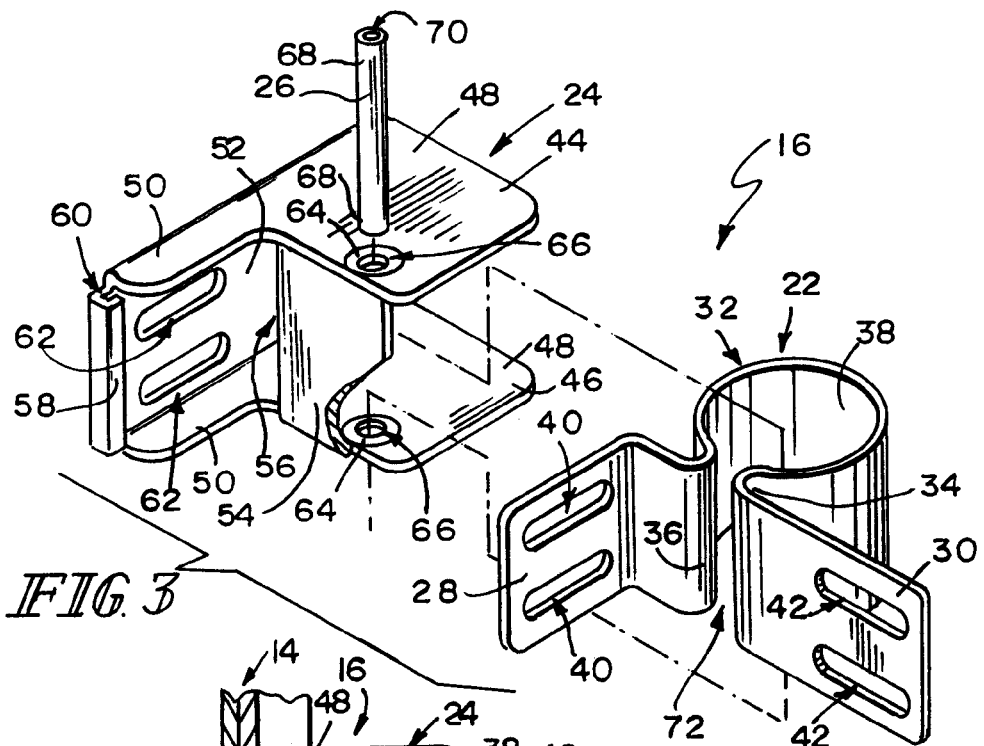
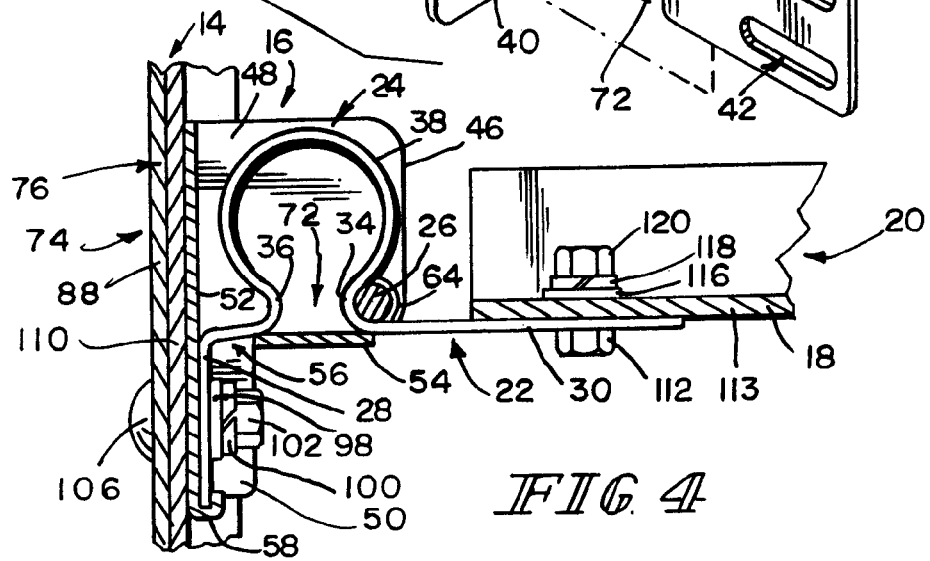
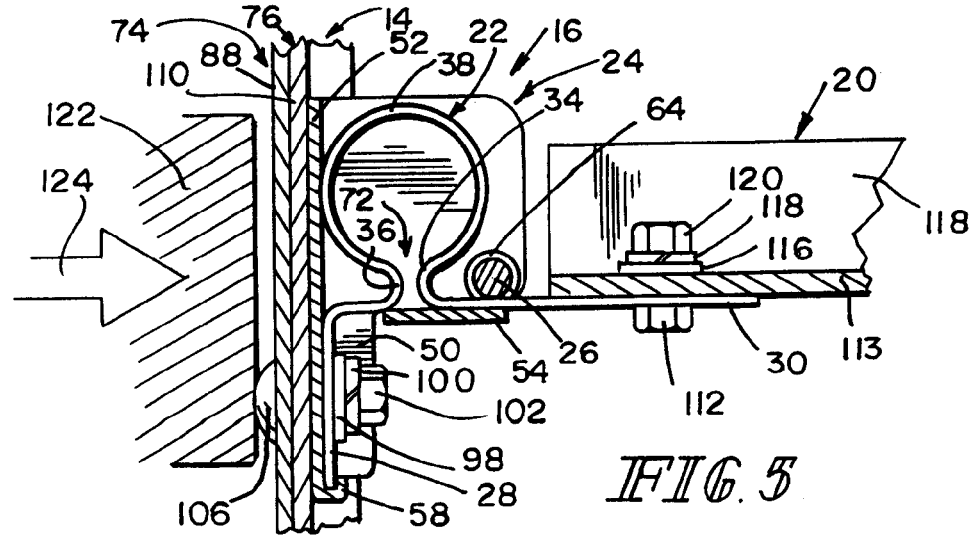

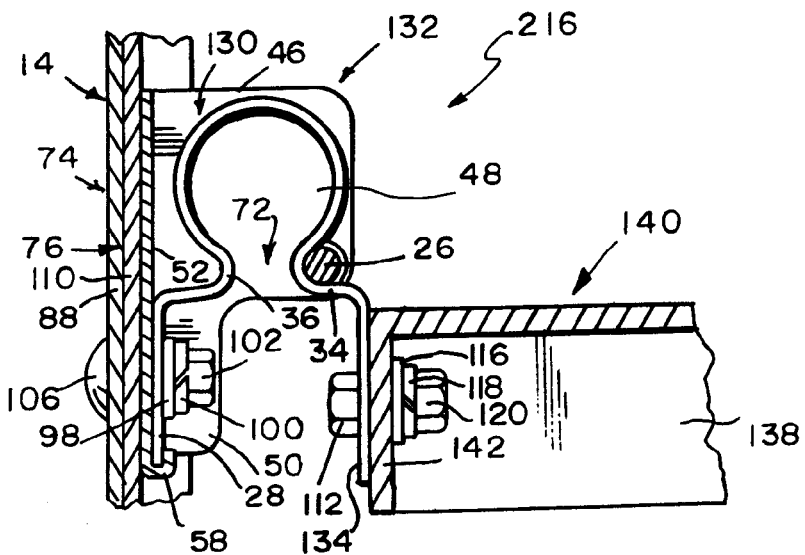
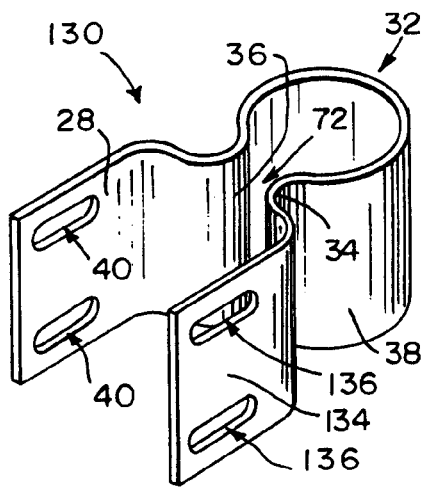
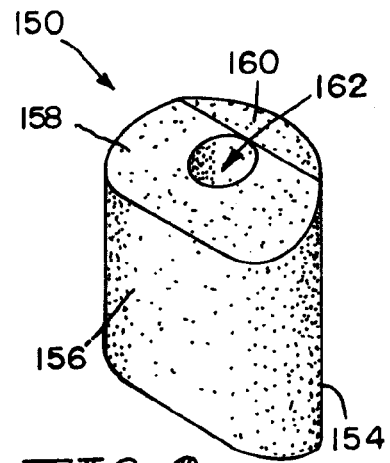
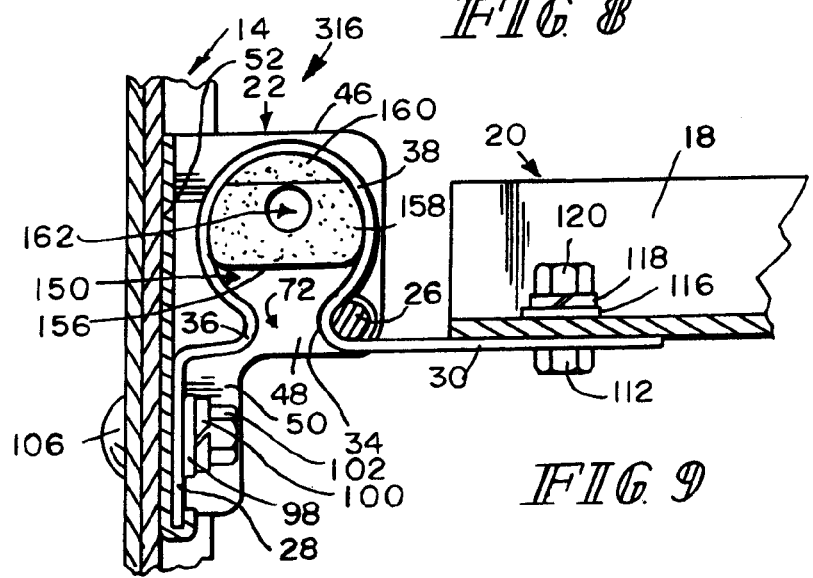

PRELOADED SPRING BUMPER FOR A VEHICLE

This application claims the benefit, under 35 U.S.C. § 119(e), of U.S. Provisional Patent Application Ser. No. 60/613,374 which was filed Sep. 27, 2004 and which is hereby incorporated by reference herein in its entirety.

BACKGROUND OF THE INVENTION

The present disclosure relates to bumpers for vehicles, and particularly, to devices for coupling bumpers to chassis of vehicles. More particularly, the present disclosure relates to spring bumpers for vehicles.

Bumpers provided at the front and the rear of vehicles are well known. Such vehicle bumpers typically are mounted to the remainder of the vehicle by one or more devices that are capable of absorbing a certain amount of impact force imparted on the bumper. During an impact, these impact-absorbing devices permit the associated bumper to move relative to the remainder of the associated vehicle and then restore the bumper to its pre-impact position after the impact. As long as the impact forces imparted on the bumper are not too great during an impact, bumpers and the associated bumper mounting devices may absorb the impact sufficiently to prevent damage to other portions of the vehicle.

SUMMARY OF THE INVENTION

The present invention comprises one or more of the features recited in the appended claims and/or the following features which, alone or in any combination, may comprise patentable subject matter:

A bumper apparatus for a vehicle may comprise a bumper, a spring, and a stop for preloading the spring. The spring may comprise a flexible ribbon of material. The spring may have a first connector portion coupled to the bumper and a second connector portion adapted to couple to the vehicle. In addition, the spring may have a curvy portion coupled to the first and second connector portions. The stop may engage the spring to hold the spring in a partially flexed state.

The bumper apparatus may further comprise a bracket to which the spring and the stop may be coupled. The bracket may have a top plate and a bottom plate and at least a portion of the spring may be situated between the top and bottom plates. The stop may extend between the top and bottom plates of the bracket. The top and bottom plates may each have a hole in which end regions of the stop are received. The stop may comprise a pin. The top and bottom plates of the bracket may each have a dimple which extends toward the spring. The first connector portion of the spring may terminate at an end region and the bracket may have a catch lip that extends around the end region of the first connector portion.

The curvy portion of the spring may have a first undulation that engages the stop when the spring is in the partially flexed state. The curvy portion of the spring may also have a second undulation that is spaced from the first undulation such that a gap exists between the undulations. When the spring is flexed by an additional amount beyond the partially flexed state, the undulations may move closer and the gap may be reduced in size. The bracket may have a vertical plate that extends between the top and bottom plates to shield the gap. Each of the first and second connector portions of the spring may be substantially flat. When the spring is in the partially flexed state, the first connector portion may be substantially perpendicular to the second connector portion. Alternatively, when the spring is in the partially flexed state, the second connector portion may be substantially parallel with the second connector portion.

The curvy portion of the spring may further have a substantially cylindrical portion. The first undulation may interconnect the first connector portion and the cylindrical portion. Furthermore, the second undulation may interconnect the second connector portion and the cylindrical portion. The cylindrical portion may change diameter in response to an impact to the bumper. The cylindrical portion may have a bore and the gap between the first and second undulations may open into the bore of the cylindrical portion. The cylindrical portion may circumscribe at least 240 degrees. The cylindrical portion may have a radius of curvature that is larger than respective radii of curvature of the first and second undulations.

Optionally, a compression insert may be situated adjacent the curvy portion of the spring. The compression insert may be compressed by the spring during an impact to the bumper. The compression insert may be situated in the bore of the substantially cylindrical portion of the spring. The compression insert may abut a concave surface of the cylindrical portion. The compression insert may have inclined upper and lower surfaces. A bore may be formed through the compression insert. The bore may be open at the inclined upper and lower surfaces.

The bumper may have a main bumper rail and a reinforcement rail coupled to the main bumper rail. The bumper apparatus may have at least one fastener extending through respective openings provided in each of the main bumper rail, the reinforcement rail, and the first connector portion of the spring. The bumper apparatus may further comprise a pair of fasteners to couple the bracket and spring to the bumper. The bracket may have a first pair of elongated slots extending horizontally and the spring may have a second pair of elongated slots extending horizontally. Each fastener of the pair of fasteners may extend through a respective one of the first pair of elongated slots and a respective one of the second pair of elongated slots.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures, in which:

FIG. 3 is an exploded perspective view of one of the mounting assemblies showing a bracket, a pin arranged for insertion into apertures provided in top and bottom plates of the bracket, and a spring arranged for insertion into a space defined between the top and bottom plates of the bracket;

FIG. 4 is a horizontal cross sectional view showing a first end of one of the springs coupled to the associated frame member of the chassis, the associated bracket and a second end of the spring coupled to the bumper, and the spring being held in a preloaded condition by the pin which engages a first undulation formed in the spring;

FIG. 5 is a horizontal cross sectional view, similar to FIG. 4, showing an object impacting the bumper and showing the spring flexing such that the pin separates away from the first undulation and moves along with the bracket toward the frame member of the chassis resulting in a reduction in size of a gap defined between the first undulation and a second undulation of the spring;

FIG. 6 is a perspective view of an alternative spring having a pair of slotted connector portions, a substantially cylindrical portion, and a pair of undulations interconnecting the cylindrical portion and the pair of connector portions;

FIG. 7 is horizontal cross sectional view, similar to FIGS. 4 and 5, showing the alternative spring situated in the associated bracket with one of the undulations engaging the associated pin, one of the connector portions of the alternative spring coupled to an associated frame member of a vehicle chassis, and the other connector portion of the alternative spring and the bracket coupled to the bumper;

FIG. 8 is a perspective view of a compression insert which, optionally, may be inserted into a space defined by an associated cylindrical portion of either of the disclosed springs; and FIG. 9 is a horizontal cross sectional view, similar to FIGS. 4 and 5, showing the compression insert situated in the space defined by the cylindrical portion of the associated spring.

DETAILED DESCRIPTION OF THE DRAWINGS

Figure 1:
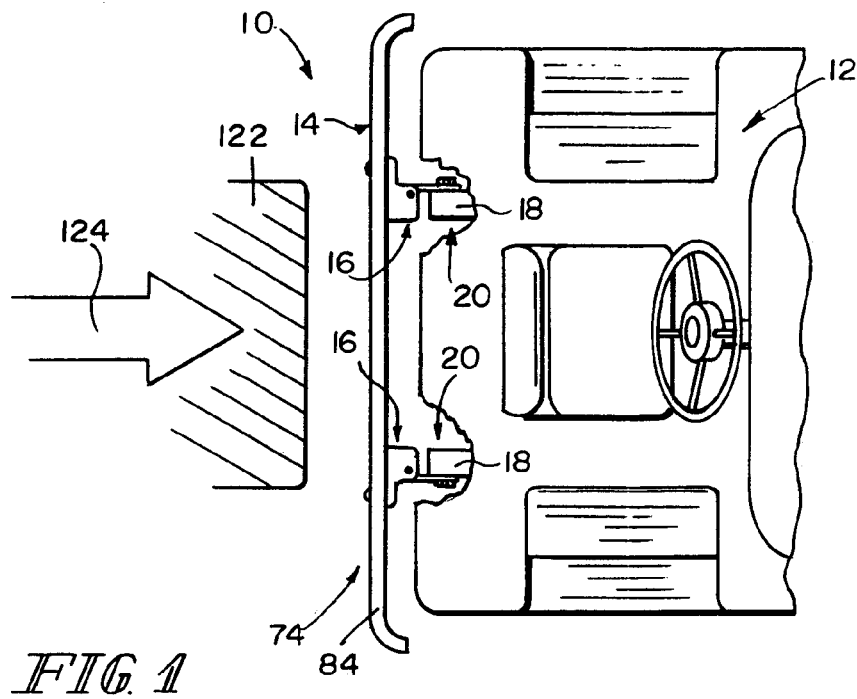
FIG. 1 is a top plan view of a vehicle having a bumper at a rear end thereof, an object moving toward the bumper, and the bumper being mounted to a chassis of the vehicle by a pair of mounting assemblies.

A bumper apparatus 10 is coupled to a vehicle 12 as shown in FIG. 1. Illustrative vehicle 12 is an industrial type of vehicle, such as a fork lift or a transport vehicle used at airports to transport fuel or to tow trailers that carry baggage, for example. However, this disclosure contemplates that bumper apparatus 10 may be used on any and all types of vehicles, not just industrial vehicles. In the illustrative example, bumper apparatus 10 is mounted at the rear of vehicle 12. However, another bumper apparatus 10 may be mounted at the front of vehicle 10, if desired.

Figure 2:
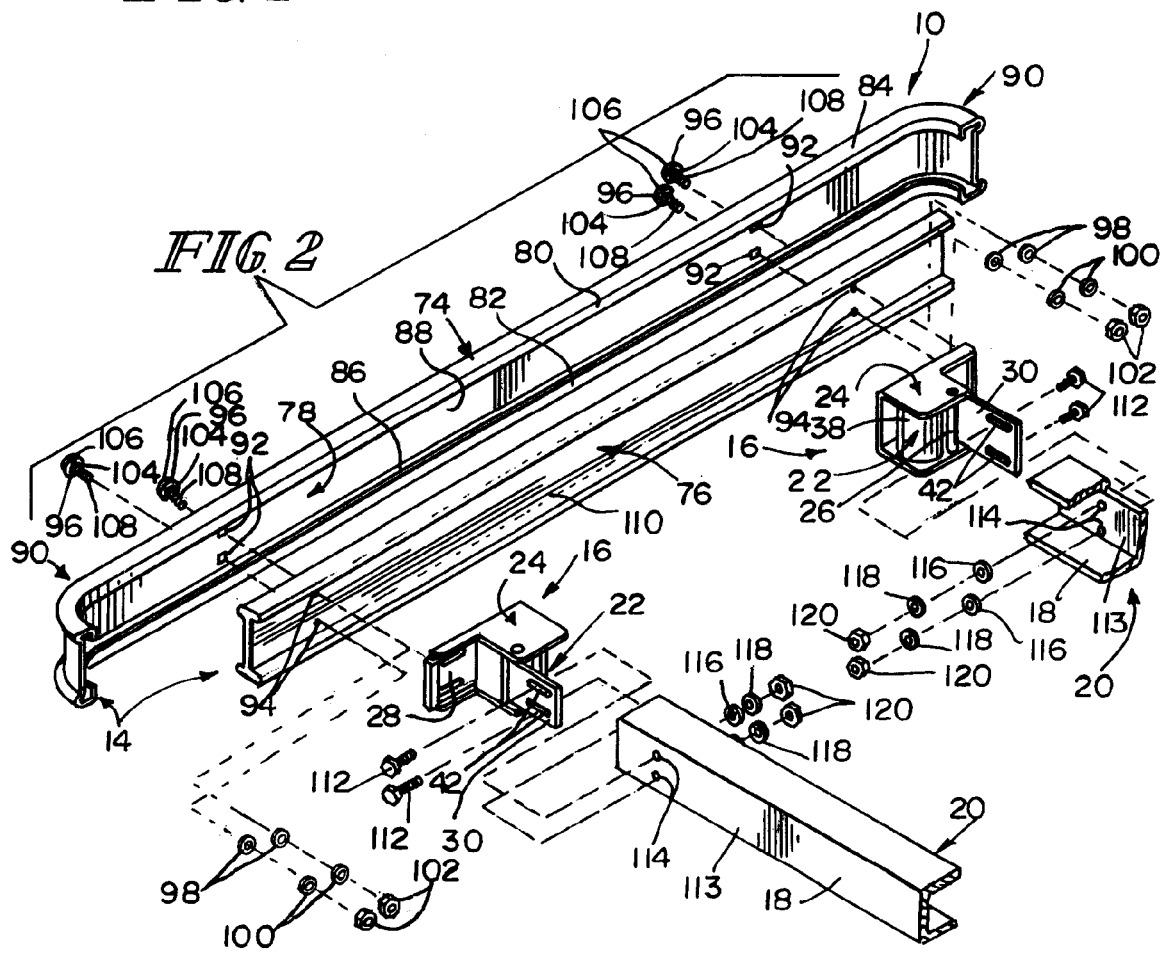
FIG. 2 is an exploded perspective view showing the pair of mounting assemblies arranged for coupling to respective frame members of a chassis of the vehicle and to the bumper and showing the bumper having an outer bumper rail and a reinforcement rail.

Apparatus 10 includes a bumper 14 and a pair of mounting assemblies 16 coupled to bumper 14 as shown in FIGS. 1 and 2. Illustratively, mounting assemblies 16 are also coupled to respective frame members 18 of a chassis 20 of vehicle 12. If desired, mounting assemblies 16 may couple to other portions of vehicle 12 in lieu of coupling to chassis 20. Furthermore, although two mounting assemblies 16 couple bumper 14 to vehicle 12 in the illustrative example of apparatus 10, more or less than two mounting assemblies 16 may be used to couple bumper 12 to vehicle 12 if desired. Mounting assemblies 16 each include an impact-absorbing element 22, a bracket 24, and a stop 26 as shown best in FIG. 3. Element 22 and stop 26 of each mounting assembly 16 are coupled to a respective bracket 24. The following description of one of mounting assemblies 16 is applicable to both mounting assemblies 16 unless specifically noted otherwise.

Illustrative impact-absorbing element 22 comprises a spring made from a ribbon of material. Therefore, element 22 is referred to herein as "spring 22." While spring 22 may be made from any material having suitable strength and flexibility characteristics, in one embodiment, spring 22 is made from 1075 carbon steel which is through hardened at 1575° Fahrenheit and quenched in a salt bath at 625° Fahrenheit. Spring 22 has a first connector portion 28, a second connector portion 30, and a curvy portion 32 that extends between connector portions 28, 30 as shown, for example, in FIGS. 3-5. Each of connector portions 28, 30 are substantially flat. Curvy portion 32 includes a first undulation 34, a second undulation 36, and a substantially cylindrical portion 38. Undulation 34 interconnects portions 30, 38. Similarly, undulation 36 interconnects portions 28, 38. Cylindrical portion 38 has a radius of curvature that is larger than the respective radii of curvature of undulations 34, 36.

Illustrative spring 22 is a unitary piece of material which has a substantially uniform thickness and a substantially uniform height at all locations therealong as best shown in FIG. 3. In other embodiments, spring 22 may have varying height and/or varying thickness therealong at the discretion of the designer. Such variations in height and/or thickness may be made to increase or decrease the flexibility of spring 22 as desired. In one embodiment, the upper and lower edges of portions 28, 30, 32 and the end edges of portions 28, 30 are radiused. In other embodiments, one or more of the edges of portions 28, 30, 32 of spring 22 are substantially flat. Portion 28 has a first pair of openings 40 and portion 30 has a second pair of openings 42 as shown in FIG. 3. In the illustrative embodiment, each of openings 40, 42 is elongated and oriented horizontally.

Bracket 24 comprises a top plate 44 and a bottom plate 46 that is spaced from and substantially parallel with top plate 44 as shown in FIG. 3. Each of plates 44, 46 are L-shaped having a large portion 48 which is generally square in shape and a small portion 50 which protrudes from one of the corner regions of the associated square-shaped large portion 48. Portions 28, 32 of spring 22 are received in a space defined between plates 44, 46. Illustratively, cylindrical portion 38 and undulations 34, 36 of spring 22 are situated between large portions 48 of plates 44, 46 and connector portion 28 of spring 22 is situated between small portions 50 of plates 44, 46. Connector portion 30 of spring 22 extends outwardly from the space between large portions 48 of plates 44, 46. Thus, portion 30 of spring 22 protrudes beyond bracket 24 as shown in FIGS. 2, 4 and 5.

Bracket 24 includes a first vertical plate 52 extending between top and bottom plates 44, 46 as shown in FIG. 3. Bracket 22 also includes a second vertical plate 54 that extends between top and bottom plates 44, 46 and that is perpendicular to first vertical plate 52. However, vertical plate 54 is spaced from vertical plate 52 to define an opening 56 through which portion 28 of spring 22 is passed during construction of mounting assembly 16. Bracket 22 has a catch lip 58 provided at one of the ends of vertical plate 52. Catch lip 58 has a groove 60, shown in FIG. 3, that is sized to receive end region of portion 28 of spring 22. Thus, catch lip 58 extends around the end region of connector portion 28 of spring 22 as shown in FIGS. 4 and 5. Catch lip 58 helps to retain spring 22 in place relative to bracket 22.

A portion of vertical plate 52 that extends between small portions 50 of top and bottom plates 44, 46 has a pair of openings 62 as shown in FIG. 3. Openings 62 are each elongated and oriented horizontally. When the end region of portion 28 of spring 22 is received in groove 60 of catch lip 58, each of the openings 62 provided in vertical plate 52 is in registry with a respective one of the openings 40 provided in portion 28. Portions 48 of top and bottom plates 44, 46 each have a dimple 64 that protrudes by a slight amount away from the remainder of plates 44, 46 and into the space between plates 44, 46. Thus, dimples 64 each extend toward spring 22 and, in some instances, engage either or both of the upper and lower edges of undulation 34 thereby to reduce, or altogether eliminate, any clearance between spring 22 and plates 44, 46.

Dimples 64 are formed near corner regions of portions 48 of plates 44, 46 adjacent to vertical wall 54.

A substantially round hole 66 is provided generally in the center of each dimple 64 as shown in FIG. 3. Illustrative stop 26 comprises a cylindrical pin, sometimes referred to herein as "pin 26," and the end regions 68 of pin 26 are received in respective holes 66. While pin 26 is solid along most of its length, end regions 68 of pin 26 have bores 70 provided therein as shown in FIG. 3 (only one of bores 70 can be seen in FIG. 3). During construction of mounting assembly 16, pin 26 is inserted through holes 66 so that the tips of end regions 68 extend beyond dimples 64 above and below plates 44, 46, respectively. The tips of end regions 68 exposed above and below plates 44, 46, respectively, are then deformed, such as by riveting, heading, or a similar operation, into a configuration that is too large to pass through openings 66. Thus, the deformation of the tips of end regions 68 of pins 26 prevents the removal of pin 26 from holes 66 thereby to couple pin 26 to bracket 24. After being coupled to bracket 24, stop 26 extends between top and bottom brackets 44, 46.

By having bores 70 formed in end regions 68 of pin 26, less force is required to deform end regions 68. However, in some embodiments, bores 70 may be omitted from end regions 68, yet end regions 68 still may be deformed to couple pin 26 to bracket 24. In other embodiments, coupling mechanisms such as cotter pins, C-rings, E-rings, nuts, and the like, may be attached to either or both ends of pin 26 to couple pin 26 to bracket 24. If a coupling mechanism, such as those just described, is attached only to one end of the associated pin 26, an opposite end of the pin may have an enlarged head. It still other embodiments, pin 26 may be coupled to bracket 24 by adhesive, welding, soldering, brazing, or the like. While bracket 24 and stop 26 may be made from any material having suitable strength, bracket 24 and stop 26 are typically made from metal, such as stainless steel.

Prior to insertion of pin 26 through holes 66, spring 22 is situated between plates 44, 46 so that the end region of connector portion 28 is received in groove 60 of catch lip 58. Also prior to insertion of pin 26 through holes 66, spring 22 is flexed to shorten a gap 72 that is defined between undulations 34, 36. Spring 22 is flexed sufficiently to move undulation 34 past holes 66 toward vertical wall 52 of bracket 52. After spring 22 is flexed in this manner, pin 26 is inserted through holes 66 and coupled to bracket 24 as described above.

After pin 26 is inserted through holes 66 of bracket 24 and after spring 22 is released, a concave surface of undulation 34 engages pin 26 as shown in FIG. 4. Engagement between undulation 34 and pin 26 prevents spring 22 from returning to its unflexed or relaxed state. Thus, spring 22 is held in a partially flexed state by stop 26. Undulation 34 and parts of portions 30, 38 in close proximity to undulation 34 form a trough in which stop 26 nests under normal conditions in which spring 22 engages stop 26 in the partially flexed state. The nesting of stop 26 relative to spring 22 in this manner helps to retain spring 22 in place relative to bracket 24. Mounting assembly 16 is configured so that when spring 22 is in the partially flexed state, portion 30 is substantially perpendicular to portion 28 as shown in FIGS. 2-5. When spring 22 is in the relaxed state, an obtuse angle is defined between portions 28, 30. In one embodiment, movement of spring 22 from the relaxed state to the partially flexed state causes gap 72 between undulations 34, 36 to be reduced in size from about 2 inches (5.08 cm) to about 1.5 inches (3.81 cm).

In the illustrative example, bumper 14 comprises a main bumper rail 74 and a reinforcement rail 76 as shown in FIG. 2. Reinforcement rail 76 has a cross sectional shape that is akin to an I-beam. Rail 74 has an elongated space 78 in which rail 76 is received. Rail 74 has a top wall 84, an upper lip 80 extending downwardly from top wall 84, a bottom wall 86, a bottom lip 82 extending upwardly from bottom wall 86, and a front wall 88 extending between top and bottom walls 84, 86. Rail 76 is retained within space 78 by lips 80, 82. Front wall 88 of rail 74 follows the contour of the I-beam shape along the front of rail 74. Rail 74 has curved end regions 90 which are formed by bending the ends of rail 74. Prior to bending the ends of rail 74 to form curved end regions 90 (i.e., while rail 74 is still substantially straight from end to end) rail 76 is slid into space 78 along the long axis of rail 74. After rail 76 is situated in space 78, the ends of rail 74 are bent. While rails 74, 76 of bumper 14 may be made from any materials having suitable strength, in one embodiment, rail 74 is made of a sheet of stainless steel and rail 76 is made of an aluminum extrusion.

Rail 74 has first and second pairs of square holes 92 and rail 76 has first and second pairs of round holes 94 as shown in FIG. 2. Each of holes 92 is aligned with a respective one of holes 94. Apparatus 10 has first and second pairs of fasteners 96. Each fastener 96 extends through one of holes 92 of rail 74, one of holes 94 of rail 76, one of openings 62 of an associated bracket 24, and one of openings 40 of portion 28 of an associated spring 22. In the illustrative example, fasteners 96 each comprise a bolt along with an associated flat washer 98, lock washer 100, and nut 102 which are mounted on respective bolts to couple mounting assemblies 16 to rails 74, 76 of bumper 14.

Each fastener 96 has a square lug 104 which is situated between a rounded head 106 and a threaded shaft 108 of the respective fastener. Lug 104 is received in an associated square hole 92 of rail 74 to prevent fasteners 96 from rotating while nuts 102 are threaded onto shafts 108. Connector portion 28 of spring 22, plate 52 of bracket 24, a vertical wall portion 110 of rail 76, and wall 88 of rail 74 are tightly clamped together between heads 106 and washers 98 of fasteners 96 when mounting assemblies 16 are coupled to bumper 14 as shown in FIGS. 4 and 5.

Frame members 18 of chassis 20 each have a vertical wall 113 which extends longitudinally relative to vehicle 10. Each wall 113 has a pair of holes 114 formed therein as shown in FIG. 2. A set of fasteners 112, shown in FIGS. 2, 4, and 5, couple apparatus 10 to frame members 18 of chassis 20. Fasteners 112 extend through respective openings 42 of connector portions 30 of spring 22 and through respective holes 114 in wall 113 of frame members 18. Illustratively, fasteners 112 each comprise a hex-head bolt along with an associated flat washer 116, lock washer 118, and nut 120 which are mounted to respective bolts to couple apparatus 10 to frame members 18 of chassis 20.

Because connector portions 30 of springs 22 are parallel with walls 113 of frame members 18 and because openings 42 are elongated and oriented horizontally, the position of apparatus 10 relative to chassis 20 along the longitudinal dimension of vehicle 10 is adjustable between a first position in which fasteners 112 are at one end of the associated openings 42 and a second position in which fasteners 112 are at an opposite end of the associated openings 42. Similarly, because wall 52 of bracket 24 and connector portion 28 of spring 22 are parallel with walls 88, 110 of bumper rails 74, 76, respectively, and because openings 40, 62 are elongated and oriented horizontally, the position of bumper 14 relative to mounting assemblies 16 along the lateral dimension of vehicle 10 is adjustable between a first position in which fasteners 96 are at one end of the associated openings 40, 62 and a second position in which fasteners 96 are at an opposite end of the associated openings 40, 62.

If bumper 14 is subjected to an impact, springs 22 absorb the impact to a certain extent. For example, if an object 122 (shown diagrammatically in FIGS. 1 and 5) such as, for example, another vehicle, moves in a direction 124 and strikes bumper 14, either or both of springs 22 flex from the partially flexed state, shown in FIG. 4, by an additional amount as shown in FIG. 5. As each spring 22 flexes by the additional amount due to the impact, the associated bracket moves in direction 124 toward chassis 20 and the associated stop 26 moves in direction 124 away from undulation 34 as shown in FIG. 5. In addition, as each spring 22 flexes by the additional amount due to the impact, cylindrical portion 38 becomes smaller in diameter and gap 72 between undulations 34, 36 becomes smaller. After the impact, spring 22 moves back to the partially flexed state assuming the forces imparted on spring 22 during the impact were not so large as to permanently damage spring 22 or to permanently damage some other component, such as bracket 24, in a manner that interferes with movement of spring 22 back to the partially flexed state after the impact. In one embodiment, spring 22 is configured such that about 2,500 lbs. of force in direction 124 is required to cause undulations 34, 36 to come into contact with each other thereby completely closing gap 72.

Vertical wall 54 of bracket 24 shields gap 72 to prevent any objects from inadvertently entering gap 72. In addition, wall 54 is in close proximity to undulations 34, 36 and engages undulations 34, 36 to inhibit unwanted lateral movement of bumper 14 relative to chassis 20. Thus, bracket 24 stabilizes bumper 14 relative to chassis 20 by limiting fixture of spring 22 in vertical and lateral directions. In some embodiments, wall 52 of bracket 24 may be lengthened so as to extend beyond an opposite side of portions 48 and associated horizontal wall portions, like portions 50, may be provided on the opposite side of portions 48. In such embodiments, top and bottom plates 44, 46 have a somewhat T-shaped configuration and an additional set of openings, like openings 62, are provided in the lengthened portion of wall 52 so that additional fasteners 96 may be used to connect such alternative mounting assemblies 16 to bumper 14.

An alternative spring 130, which is similar to spring 22, is shown in FIGS. 6 and 7. An alternative bracket 132, which is similar to bracket 24 is shown in FIG. 7. Due to the similarities between spring 22 and spring 130 and due to the similarities between bracket 24 and bracket 132, identical reference numerals are used to denote like portions of these elements. For example, spring 130 comprises connector portion 28 and a curvy portion 32 which includes undulations 34, 36 and cylindrical portion 38. The primary difference between spring 130 and spring 22 is that spring 130 has a connector portion 134 which is substantially parallel with the associated connector portion 28 when spring 130 is in its partially flexed state having undulation 34 engaging stop 26 as shown in FIG. 7. When spring 130 is in a relaxed state, portion 134 is not parallel with portion 28, but rather, an acute angle is defined between portions 28, 134. Portion 134 has a pair of openings 136 which are elongated and oriented horizontally as shown in FIG. 6.

The main differences between bracket 132 and bracket 24 are that bracket 132 has no dimples 64 and wall 54 is omitted from bracket 132. Springs 22, 134 may be mixed and matched with brackets 24, 132 as desired to create a variety of mounting assemblies. As discussed above, each mounting assembly 16 comprises spring 22 and bracket 24. In FIG. 7, a mounting assembly 216 comprises spring 130 and bracket 132. In FIG. 9, a mounting assembly 316 comprises spring 22 and bracket 132. Another mounting assembly (not shown) comprises spring 130 and bracket 24. Regardless of which of springs 22, 130 and brackets 24, 132 are used, the manner in which springs 22, 130 flex during an impact are substantially the same. That is, stop 26 separates away from undulation 34 and gap 72 shortens during an impact to bumper 14 regardless of which of springs 22, 130 and brackets 24, 132 are provided in the associated mounting assemblies which couple bumper 14 to vehicle 10.

Each mounting assembly 216 is configured to couple to an alternative frame member 138 of an alternative chassis 140 as shown in FIG. 7. Each frame member 138 has a vertical end wall 142 with a hole (not shown) which is sized for receipt of an associated fastener 112. Because connector portions 134 of spring 132 are parallel with associated walls 142 of frame members 138 and because openings 136 are elongated and oriented horizontally, the position of bumper 14 relative to chassis 140 along the lateral dimension of vehicle 10 is adjustable between a first position in which fasteners 112 are at one end of the associated openings 136 and a second position in which fasteners 112 are at an opposite end of the associated openings 136.

Optionally, a compression insert 150, shown in FIG. 8, may be situated adjacent curvy portion 32 of whichever of springs 22, 130 is being used in the associated mounting assembly. Illustratively, insert 150 is situated in a bore 152 of cylindrical portion 38 and has a substantially semi-cylindrical surface 154 that abuts a concave inner surface of portion 38 as shown in FIG. 9. Insert 150 also has a substantially flat surface 156 that faces toward gap 72 which opens into bore 152. Illustrative surface 154 contacts cylindrical portion 38 through about 180°. Insert 150 resists the flexing of spring 22, or spring 132 as the case may be, during an impact to bumper 14. Thus, the amount of force needed to completely close gap 72 is increased when insert 150 is used.

The amount of resistance to flexing provided by insert 150 is dictated by a variety of factors including the material from which insert 150 is made and the geometry of insert 150. Insert 150 is typically made from a resilient material such as rubber. Rubber comes in a wide range of durometers and therefore, rubber of an appropriate durometer may be selected at the discretion of the designer. Illustrative insert 150 has top and bottom surfaces which each include an inclined surface portion 158 and a horizontal surface portion 160 as shown in FIGS. 8 and 9 (only the top surface of insert 150 is shown). In some embodiments, the vertical distance between surfaces 160 is substantially equivalent to the vertical height of spring 22. In some embodiments, the entire top and bottom surfaces of insert 150 are horizontal.

Illustrative insert 150 has a cylindrical bore which opens at inclined portions 158 of the upper and lower surfaces of insert 150. Having bore 162 through insert 158 enhances the ability of insert 150 enhances the ability of insert 150 to compress during an impact. In alternative embodiments, bore 162 is omitted. In some embodiments, top and bottom plates 44, 46 of bracket 24 each have a dimple, similar to dimples 64, that protrudes into bore 162 by a slight amount to retain insert 150 in place.

Although certain illustrative embodiments have been described in detail above, variations and modifications exist within the scope and spirit of this disclosure as described and as defined in the following claims.

The invention claimed is:

1. A bumper apparatus for a vehicle, the bumper apparatus comprising
   a bumper,
   a spring comprising a flexible ribbon of material, the spring having a first connector portion coupled to the bumper and a second connector portion adapted to couple to the vehicle, the spring having a curvy portion coupled to the first and second connector portions,
a stop engaging the spring to hold the spring in a partially flexed state, and
a bracket, the spring being coupled to the bracket, and the stop being coupled to the bracket.

2. The bumper apparatus of claim 1, wherein the bracket comprises a top plate and a bottom plate and at least a portion of the spring is situated between the top and bottom plates.

3. The bumper apparatus of claim 2, wherein the stop extends between the top and bottom plates of the bracket.

4. The bumper apparatus of claim 2, wherein the top and bottom plates each have a hole and end regions of the stop are received in the holes.

5. The bumper apparatus of claim 2, wherein the top and bottom plates each have a dimple and each dimple extends toward the spring.

6. The bumper apparatus of claim 2, wherein the curvy portion of the spring comprises a first undulation that engages the stop when the spring is in the partially flexed state, the curvy portion of the spring comprises a second undulation spaced from the first undulation to define a gap therebetween, the gap being reduced in size when the spring is flexed by an additional amount, and the bracket comprises a vertical plate that extends between the top and bottom plates to shield the gap.

7. The bumper apparatus of claim 1, wherein the first connector portion terminates at an end region and the bracket further comprises a catch lip that extends around the end region of the first connector portion.

8. The bumper apparatus of claim 1, further comprising a pair of fasteners to couple the bracket and spring to the bumper, the bracket has a first pair of elongated slots extending horizontally, the spring has a second pair of elongated slots extending horizontally, and each of the pair of fasteners extend through a respective one of the first pair of elongated slots and a respective one of the second pair of elongated slots.

9. The bumper apparatus of claim 1, wherein the first and second connector portions each have at least one elongated opening therein.

10. The bumper apparatus of claim 1, wherein the bumper comprises a main bumper rail and a reinforcement rail coupled to the main bumper rail.

11. The bumper apparatus of claim 10, further comprising at least one fastener extending through respective openings provided in each of the main bumper rail, the reinforcement rail, and the first connector portion of the spring.

12. A bumper apparatus for a vehicle, the bumper apparatus comprising
a bumper,
a spring comprising a flexible ribbon of material, the spring having a first connector portion coupled to the bumper and a second connector portion adapted to couple to the vehicle, the spring having a curvy portion coupled to the first and second connector portions, and
a stop engaging the spring to hold the spring in a partially flexed state, wherein the curvy portion of the spring comprises a substantially cylindrical portion that changes diameter in response to an impact to the bumper, wherein the curvy portion of the spring comprises a first undulation and a second undulation, the first undulation interconnects the first connector portion and the cylindrical portion, and the second undulation interconnects the second connector portion and the cylindrical portion.

13. The bumper apparatus of claim 12, wherein the second undulation engages the stop when the spring is in the partially flexed state.

14. The bumper apparatus of claim 12, wherein the cylindrical portion has a bore, a gap is defined between the first and second undulations, and the gap opens into the bore of the cylindrical portion.

15. The bumper apparatus of claim 12, wherein a gap is defined between the first and second undulations and the gap is reduced in size in response to an impact to the bumper.

16. The bumper apparatus of claim 12, wherein the cylindrical portion circumscribes at least 240 degrees.

17. A bumper apparatus for a vehicle, the bumper apparatus comprising
a bumper,
a spring comprising a flexible ribbon of material, the spring having a first connector portion coupled to the bumper and a second connector portion adapted to couple to the vehicle, the spring having a curvy portion coupled to the first and second connector portions, and
a stop engaging the spring to hold the spring in a partially flexed state, wherein the first connector portion is substantially flat, the second connector portion is substantially flat, and the first connector portion is substantially perpendicular to the second connector portion when the spring is in the partially flexed state.

18. A bumper apparatus for a vehicle, the bumper apparatus comprising
a bumper,
a spring comprising a flexible ribbon of material, the spring having a first connector portion coupled to the bumper and a second connector portion adapted to couple to the vehicle, the spring having a curvy portion coupled to the first and second connector portions, and
a stop engaging the spring to hold the spring in a partially flexed state, wherein the first connector portion is substantially flat, the second connector portion is substantially flat, and the first connector portion is substantially parallel with the second connector portion when the spring is in the partially flexed state.

19. A bumper apparatus for a vehicle, the bumper apparatus comprising
A bumper apparatus for a vehicle, the bumper apparatus comprising
a bumper,
a spring comprising a flexible ribbon of material, the spring having a first connector portion coupled to the bumper and a second connector portion adapted to couple to the vehicle, the spring having a curvy portion coupled to the first and second connector portions,
a stop engaging the spring to hold the spring in a partially flexed state, and
a compression insert situated adjacent the curvy portion of the spring.

20. The bumper apparatus of claim 19, wherein the compression insert is compressed by the spring during an impact to the bumper.

21. The bumper apparatus of claim 19, wherein the curvy portion of the spring comprises a substantially cylindrical portion having a bore and the compression insert is situated in the bore of the substantially cylindrical portion.

22. The bumper apparatus of claim 21, wherein the compression insert abuts a concave surface of the cylindrical portion.

23. The bumper apparatus of claim 19, wherein the compression insert has inclined upper and lower surfaces, a bore is formed through the compression insert, and the bore opens at the inclined upper and lower surfaces.

24. An apparatus for coupling a bumper to a vehicle, the apparatus comprising
   a bracket,
   a spring coupled to the bracket, and
   a stop coupled to the bracket and engaging the spring to hold the spring in a partially flexed state to preload the spring, wherein the bracket comprises a top plate and a bottom plate and at least a portion of the spring is situated between the top and bottom plates.

25. The apparatus of claim 24, wherein the bracket comprises a vertical plate extending between the top plate and the bottom plate.

26. The apparatus of claim 25, wherein the stop extends between the top and bottom plates of the bracket.

27. The apparatus of claim 25, wherein the top and bottom plates each have a hole and end regions of the stop are received in the holes.

28. The apparatus of claim 25, wherein the top and bottom plates each have a dimple and each dimple extends toward the spring.

29. The apparatus of claim 24, wherein the spring comprises a first undulation that engages the stop when the spring is in the partially flexed state, the spring comprises a second undulation spaced from the first undulation to define a gap therebetween, the gap being reduced in size when the spring is flexed by an additional amount, and the bracket comprises a vertical plate that extends between the top and bottom plates to shield the gap.

30. The apparatus of claim 24, wherein the spring terminates at an end region and the bracket further comprises a catch lip that extends around the end region.

31. The apparatus of claim 24, further comprising a pair of fasteners to couple the bracket and the spring to the bumper, the bracket has a first pair of elongated slots extending horizontally, the spring has a second pair of elongated slots extending horizontally, and each of the pair of fasteners extend through a respective one of the first pair of elongated slots and a respective one of the second pair of elongated slots.

32. The apparatus of claim 24, wherein the spring comprises a substantially cylindrical portion that changes diameter when the spring is flexed by an additional amount beyond the partially flexed state.

33. The apparatus of claim 32, wherein the spring comprises first and second flat portions and the spring comprises first and second undulations that interconnect the first and second flat portions, respectively, to the cylindrical portion.

34. The apparatus of claim 33, wherein the cylindrical portion has a bore, a gap is defined between the first and second undulations, and the gap opens into the bore of the cylindrical portion.

35. The apparatus of claim 33, wherein a gap is defined between the first and second undulations and the gap is reduced in size in response to the spring being flexed by an additional amount beyond the partially flexed state.

36. The apparatus of claim 33, wherein the first flat portion is substantially perpendicular to the second flat portion when the spring is in the partially flexed state.

37. The apparatus of claim 33, wherein the first flat portion is substantially parallel with the second flat portion when the spring is in the partially flexed state.

38. The apparatus of claim 32, wherein the cylindrical portion circumscribes at least 240 degrees.

39. The apparatus of claim 24, further comprising a compression insert adjacent the spring.

40. The apparatus of claim 39, wherein the compression insert is compressed by the spring when the spring is flexed by an additional amount beyond the partially flexed state.

41. The apparatus of claim 39, wherein the spring comprises a substantially cylindrical portion having a bore and the compression insert is situated in the bore of the substantially cylindrical portion.

42. The apparatus of claim 41, wherein the compression insert abuts a concave surface of the cylindrical portion.

43. The apparatus of claim 39, wherein the compression insert has inclined upper and lower surfaces.

44. The apparatus of claim 43, wherein a bore is formed through the compression insert and the bore opens at the inclined upper and lower surfaces.

45. The apparatus of claim 39, wherein a bore is formed through the compression insert.

* * * * *